United States Patent
Aoki (10) Patent No.: US 7,999,814 B2
(45) Date of Patent: Aug. 16, 2011

(54) INFORMATION PROCESSING APPARATUS, GRAPHICS PROCESSOR, CONTROL PROCESSOR AND INFORMATION PROCESSING METHODS

(75) Inventor: Sachiyo Aoki, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 738 days.

(21) Appl. No.: 11/911,809

(22) PCT Filed: Sep. 19, 2006

(86) PCT No.: PCT/JP2006/318482
§ 371 (c)(1),
(2), (4) Date: May 15, 2008

(87) PCT Pub. No.: WO2007/055067
PCT Pub. Date: May 18, 2007

(65) Prior Publication Data
US 2008/0211820 A1      Sep. 4, 2008

(30) Foreign Application Priority Data
Nov. 8, 2005  (JP) .................................. 2005-323784

(51) Int. Cl.
*G06F 15/16* (2006.01)
*G06T 1/20* (2006.01)
*G06T 1/00* (2006.01)

(52) U.S. Cl. ......... 345/522; 345/503; 345/504; 345/506
(58) Field of Classification Search .................. 345/503, 345/504, 506, 522; 719/318; 700/14
See application file for complete search history.

(56) References Cited

U.S. PATENT DOCUMENTS

| 5,349,680 A * | 9/1994 | Fukuoka ...................... 718/108 |
| 5,619,624 A | 4/1997 | Schoenzeit et al. |
| 5,794,036 A | 8/1998 | Gomi et al. |

(Continued)

FOREIGN PATENT DOCUMENTS
EP        1256878 A2    11/2002
(Continued)

OTHER PUBLICATIONS

Japanese Patent Office, "Notification of Reason(s) for Refusal" issued in corresponding Japanese Patent Application No. 2005-323784, dated Dec. 11, 2006, four pages including an English-language translation.

(Continued)

*Primary Examiner* — Hau H Nguyen
(74) *Attorney, Agent, or Firm* — Fitch, Even, Tabin & Flannery (57) ABSTRACT

An arithmetic processing unit in a graphics processor alternately executes a process of a first image processing which generates a main image of an application, i.e., a base image and a process of a second image processing which generates a display image eventually displayed by performing a desired processing of the base image. Processing time for the process of the first image processing is designated by a first process executing unit in a main processor which requests execution of the process of the first image processing. Processing time for the process of the second image processing is predetermined. The first process executing unit further determines an address of storage area in a frame buffer storing the base image and, upon determination, transmits to the second process executing unit which requests execution of the process of the second image processing.

12 Claims, 6 Drawing Sheets

U.S. PATENT DOCUMENTS

2002/0082714 A1* 6/2002 Kumamoto et al. .............. 700/1
2002/0130870 A1 9/2002 Ebihara

FOREIGN PATENT DOCUMENTS

| GB | 2320113 A | 6/1998 |
|---|---|---|
| JP | 63-036444 A | 2/1988 |
| JP | 10-171668 A | 6/1998 |
| JP | 2000-149002 A | 5/2000 |
| JP | 2002-328818 A | 11/2002 |

OTHER PUBLICATIONS

Japanese Patent Office (as PCT ISA) "International Search Report" issued in corresponding International Application No. PCT/JP2006/318482, dated Dec. 19, 2006, four pages including an English translation.

European Patent Office; "Extended European Search Report (including the Supplementary European Search Report and the European Search Opinion)" issued in corresponding European Application No. 06798093.8 for PCT/JP2006/318482; dated Jan. 18, 2010; 5 pages.

Patent Cooperation Treaty; "International Preliminary Report on Patentability:" for corresponding PCT International Application No. PCT/JP2006/318482; May 14, 2008; 1 page In English.

Patent Cooperation Treaty; "Written Opinion of the International Searching Authority:" for corresponding PCT International Application No. PCT/JP2006/318482; Dec. 19, 2006; 6 pages including English translation.

* cited by examiner

INFORMATION PROCESSING APPARATUS, GRAPHICS PROCESSOR, CONTROL PROCESSOR AND INFORMATION PROCESSING METHODS

TECHNICAL FIELD

The present invention relates to information processing technology, and more particularly to a method for information processing including image processing and an information processing apparatus, a graphics processor and a control processor to which the method is applied.

BACKGROUND TECHNOLOGY

Along with the recent development of computer graphics technology, image data output from an information processing apparatus such as a mainframe, a personal computer and a game console has grown more complicated and advanced. These information processing apparatuses incorporate a graphics processor specifically for image processing other than a main processor which executes common arithmetic processing, in order to offload image processing tasks from the main processor and try to eliminate overhead of the system.

In these information processing apparatuses, when tasks corresponding to a plurality of applications are processed in time sharing manner, generally, a graphics processor executes image processing corresponding to a plurality of tasks processed by a main processor in correspondence with high speed computation of the main processor.

DISCLOSURE OF THE INVENTION

Problem to be Solved by the Invention

On the other hand, requirements for higher resolution of a moving image displayed by computer graphics are relentless. Improvements in hardware, such as, introduction of a high-speed CPU, a large capacity memory or a broadband bus, as the only solution to meet the needs of real-time image displaying with high resolution is getting difficult because of cost and design constraints.

In this background, the purpose of the present invention is to provide a technology for executing information processing including image processing computing effectively.

Means to Solve the Problem

An information processing apparatus according to at least one embodiment of the present invention comprises: a graphics processor which switches and executes a process of a first image processing generating image data on a first image as a unit of display and a process of a second image processing performing processing of the first image and generating a second image; and a main processor which controls the graphics processor, wherein the graphics processor comprises: an arithmetic processing unit which executes one step of process of the first image processing, variably controlling one processing time span, and executes one step of process of the second image processing within a predetermined processing time; and a process completion notifying unit which notifies the main processor about completion of one step of process of the first image processing, and the main processor comprises a process switching requesting unit which requests the graphics processor to switch the process in the arithmetic processing unit from the process of the first image processing to the process of the second image processing when detecting the completion of one step of process of the first image processing communicated by the process completion notifying unit and to switch from the process of the second image processing to the process of the first image processing at the point in time when the predetermined processing time expires.

"A unit of display" of image may be any of units which compose an image, such as a frame, a picture or a field.

The information processing apparatus further comprises a local memory including a storage area into which the graphics processor temporally stores the image data on the first image; wherein the main processor further comprises: a first process executing unit which generates and issues request information on items to be executed in the process of the first image processing to the graphics processor; and a second process executing unit which generates and issues request information on items to be executed in the process of the second image processing to the graphics processor; wherein the first process executing unit determines information on the storage area in the local memory for the image data on the first image when generating the request information on items to be executed in the process of the first image processing and provides the information on the storage area for the image data on the first image to the second process executing unit; and the second process executing unit incorporates the information on the storage area acquired from the first process executing unit in the request information on items to be executed in the process of the second image processing; and the arithmetic processing unit in the graphics processor identifies, in the process of the second image processing, image data of the first image based on information on the storage area included in the instruction information acquired from the second process executing unit and performs processing of the identified image data.

The "request information on items to be executed" may be request information on each processing executed by the graphics processor or request information on a bundle of a plurality of the processing. The request does not limit to a request for processing categorized as image processing, as far as the processing is executed by the graphics processor. For example, request information for switching processes is also included in the "request information on items to be executed". "Information on a storage area" may be any of address information in a local memory, an ID of a partitioned area in the local memory, etc. The "information on a storage area" may also include the capacity of the storage area, the number of partitioned areas or the like.

A graphics processor according to at least one embodiment of the present invention comprises: an arithmetic processing unit which switches and executes a process of a first image processing generating image data on a first image as a unit of display and a process of a second image processing performing processing of the first image and generating a second image; and a switching processing unit which switches the process in the arithmetic processing unit from the process of the first image processing to the process of the second image processing at a point in time when predetermined items to be executed completes and switches from the process of the second image processing to the process of the first image processing at a point in time when a predetermined processing time expires.

A control processor according to at least one embodiment of the present invention is a control processor for controlling a graphic processor which switches and executes a process of a first image processing that generates image data on a first image as a unit of display and temporarily stores the data in a storage area in a memory and a process of a second image processing that identifies the image data on the first image stored in the storage area in the memory and generates a second image by performing processing of the first image, comprising a first process executing unit which generates and issues request information on items to be executed in the process of the first image processing for the graphics processor; and a second process executing unit which generates and issues request information on items to be executed in the process of the second image processing for the graphics processor, wherein the first process executing unit determines information on the storage area in the memory storing the image data on the first image when generating request information on items to be executed in the process of the first image processing, and provides the second process executing unit with the determined information on the storage area storing the image data on the first image, and the second process executing unit which allows the graphics processor to identify the image data on the first image in the process of the second image processing by including the information on the storage area acquired from the first process executing unit in the request information on items to be executed in the process of the second image processing.

A information processing method according to at least one embodiment of the present invention comprises: executing the process for generating image data on a first image; switching to the process which performs processing of the first image and generates image data on a second image after at least a predetermined unit of the image data on the first image is generated; executing the process for generating the image data on the second image; switching to the process which generates the image data on the first image at a point in time when a predetermined processing time for the process for generating the image data on the second image expires.

Optional combinations of the aforementioned constituting elements, and implementations of the invention in the form of methods, apparatuses, systems, computer programs and the likes may also be practiced as additional modes of the present invention.

According to the present invention, information processing including image processing can be executed efficiently.

DESCRIPTION OF THE REFERENCE NUMERALS

50 . . . main memory, 100 . . . graphics processor, 102 . . . control block, 104 . . . display controller, 106 . . . arithmetic processing unit, 108 . . . local memory, 109 . . . frame buffer, 112 instruction acquiring unit, 114 . . . image completion notifying unit 116 . . . process switching unit, 118 . . . process completion notifying unit, 200 . . . main processor, 202 . . . first process executing unit, 204 . . . second process executing unit, 206 . . . processing time determining unit, 208 . . . switching instruction issuing unit, 210 . . . image switching requesting unit, 500 . . . display apparatus, 1000 . . . information processing apparatus

BEST MODE FOR CARRYING OUT THE INVENTION

According to the present embodiment, a graphics processor executes image processing based on a request from a main processor. The main processor requests, for example, to generate a moving image expressing a game world which corresponds to a game application. In order to implement one of the functions provided by the application or an OS, the main processor further requests to generate an on-screen image to be displayed on the moving image depicting the game world. These two requests are executed while being switched in the graphics processor as different processes. Hereinafter, the main image such as a moving image depicting the game world corresponding to an application or the like is referred to as a "base image", and the image eventually displayed on a display apparatus on which an on-screen display or the like is added is referred to as a "display image". A display image may be the same image as a base image as far as it is displayed on the display apparatus eventually. A display image may also be an image generated by performing some kind of processing other than displaying an on-screen display, such as adding a frame or a background image on a base image.

Generally, in case a graphics processor generates a high resolution base image with a large size of image data, a large amount of processing is required to generate one unit of display of image. The present inventor recognizes that switching processes in a graphics processor in synchronization with switching processes in a main processor may lead to increased overhead because of saving and restoring of image data on a base image in the middle of processing. In case of an application in which an output moving image changes in real-time by a user's manipulation (e.g. a game), this overhead leads to lower quality of the image, such as stopping of the moving image or dropping of a frame. Therefore, the present embodiment implements a processing system with excellent real-time performance by not synchronizing the switching of the processes in a graphics processor with that in a main processor.

Figure 1:
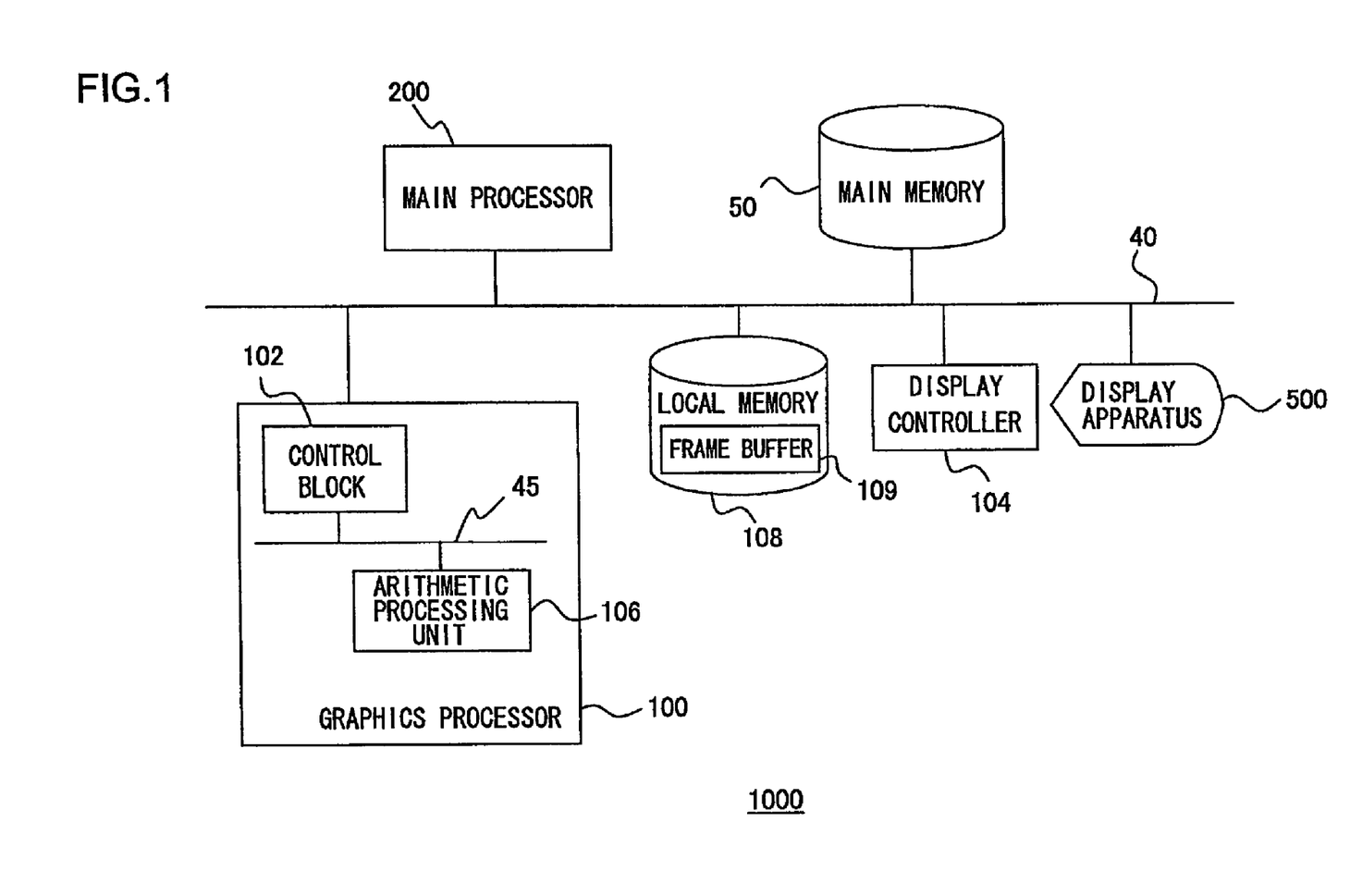
FIG. 1 shows the entire configuration of the information processing apparatus according to the present embodiment.

FIG. 1 shows the entire configuration of the information processing apparatus according to the present embodiment. The information processing apparatus 1000 includes a graphics processor 100, a main processor 200, a main memory 50, a display controller 104, a local memory 108 and a display apparatus 500. These units transmit and receive data signals each other through a main bus 40. The information processing apparatus 1000 displays an image or a video acquired through processing by the main processor 200 and the graphics processor 100 and stored in a frame buffer 109 in the local memory 108, on the display apparatus 500 under the control of the display controller 104. Each elements depicted, for example in FIG. 1, as a functional block which executes a variety of processing may be implemented hardwarewise by elements such as a CPU, a memory or other LSIs and softwarewise by a program with a reservation management function loaded into a memory and the likes. Therefore, it will be obvious to those skilled in the art that the functional blocks may be implemented by a variety of manners including hardware only, software only or a combination of both, thus not limited to any of those manners.

In this information processing apparatus 1000, an operating system (hereinafter referred to as an OS) which provides a function and an environment in which to use the information processing apparatus 1000 effectively and controls the whole apparatus is executed. On the OS, a plurality of pieces of application software (hereinafter referred to as applications) are executed.

The main processor 200 processes a task corresponding to a function provided by an application or an OS in parallel by consecutively executing each process generated by time-dividing of the task. The main processor 200 may include a plurality of sub-processors. In this case, the main processor 200 assigns the time-divided tasks to each sub-processor to execute the task. As one of the tasks, the main processor 200 generates instructions to direct the graphics processor 100 to execute processes for generating image data on a base image and a display image, and provides the instructions with the necessary data for image processing to the graphics processor 100. The main processor 200 further controls switching of processes in the graphics processor 100.

The main memory 50 is a storage area mainly used by the main processor 200. Data related to a task corresponding to an application or an OS is stored in the main memory 50. For example, instruction information to the graphics processor 100, modeling data necessary for image processing or the like is stored for a period of time.

The graphics processor 100 is a block which executes processing related to an image exclusively and is a unit which executes rendering processing or the like. The graphics processor 100 includes a control block 102 and an arithmetic processing unit 106. These blocks are connected by an internal bus 45 with each other and data signals are transmitted and received between these blocks. The graphics processor 100 generates a display image which is displayed eventually through consecutive execution of a plurality of processes while switching the processes. The switching of the processes is executed not in synchronization with the switching of the processes in the main processor 200.

The control block 102 is a block which controls the entirety of the graphics processor 100. For example, the control block 102 acquires instruction information on processing to be executed by the arithmetic processing unit 106 which is issued by the main processor 200, and makes the arithmetic processing unit 106 to execute the process. Further, the block 102 performs processing which relates to process switching.

The arithmetic processing unit 106 executes a variety of arithmetic processing which relates to graphics in accordance with an instruction from the main processor 200. One example of the processing is a series of rendering which comprises generating image data on a base image or a display image through a coordinate transformation, a hidden surface removal and shading based on three-dimensional modeling data, and writing the data thus generated into the frame buffer 109 in the local memory 108. The arithmetic processing unit 106 includes a functional block such as a rasterizer, a shader unit, a texture unit or the like (not shown) for high speed execution of processing which especially relates to three-dimensional graphics.

The local memory 108 is a storage area mainly used by the graphics processor 100 and stores, for example, data necessary for image processing. The local memory 108 includes the frame buffer 109 which is a storage area for storing image data generated by the arithmetic processing unit 106. In case a display image which is displayed eventually is generated by adding another image on, for example, some parts of the base image which is generated as a result of image processing corresponding to an application, the image data of the base image is stored in the frame buffer 109 temporarily. The display image obtained by a certain processing of the stored data is further stored in the frame buffer 109.

The display controller 104 generates horizontal and vertical synchronizing signals and, in conformance with the display timing of the display apparatus 500, reads pixel data of the image data line by line from the frame buffer 109. The display controller 104 further transforms the pixel data read line by line from digital data which consists of RGB color values into the format compatible with the display apparatus 500 and outputs the data.

Figure 2:
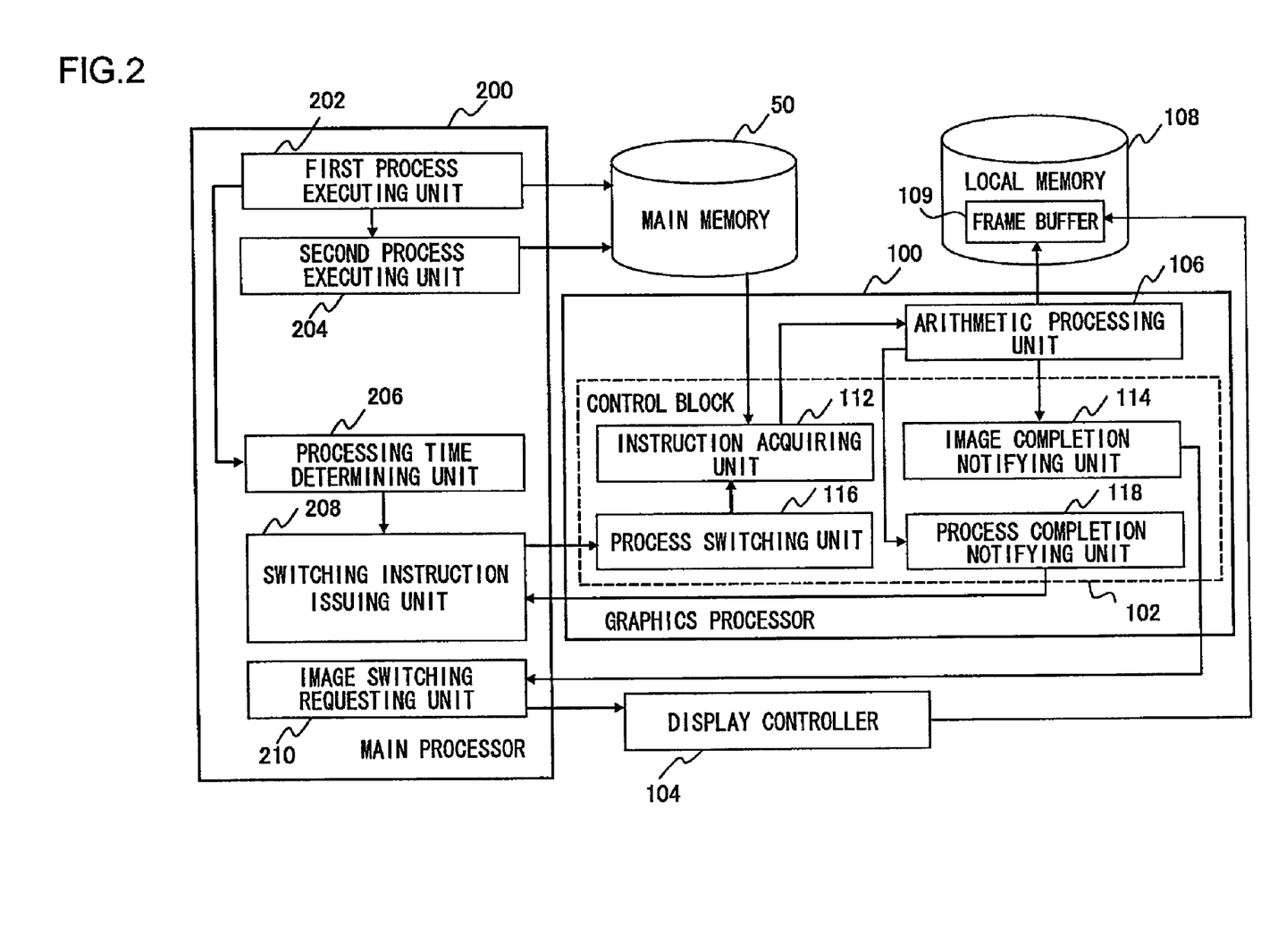
FIG. 2 shows the configuration of a graphics processor, a main processor, a main memory, a local memory and a display controller according to the present embodiment.

The following description explains the operation of the information processing apparatus 1000 configured as described above with a focus on a process switching control method in the graphics processor 100, which is a major feature of the present embodiment. FIG. 2 shows configuration of the graphics processor 100, the main processor 200, the main memory 50 and the display controller 104 according to the present embodiment in further detail.

The main processor 200 comprises the first process executing unit 202 which corresponds to a certain application and executes the first process including a request to generate a base image, and the second process executing unit 204 which corresponds to a part of a function of the application or the OS and executes the second process including a request to generate a display image. The first process executing unit 202 and the second process executing unit 204 write instruction information to make the graphics processor 100 execute image processing which originates in the middle of each process, into the areas allocated to each process in the main memory 50. Hereinafter, these storage areas in the main memory 50 are referred to as the first storage area and the second storage area, respectively. The instruction information may be stored in a memory (not shown) in the graphics processor 100.

The first process is, for example, the main process of a game or an application for moving image reproduction which is mainly executed by a user and is a process which generates the base image. On the other hand, the second process is a process which generates a display image, for example, by superimposing a chat window, a dialogue for cautionary notice or the like or putting a frame on the base image. The second process may correspond to any of the functions provided by the application or the OS. The second process may include a process in which no processing is performed on a base image for generating a display image. Although, the first process executing unit 202 and the second process executing unit 204 are shown separately in FIG. 2 for brevity, these processes may be time-divided and allocated to time slices instead of allocating each process to each sub-processor. The combination of both is also possible. Further, at least one of the first process and the second process may be comprised of a plurality of sub-processes. In this case, the first process executing unit 202 and the second process executing unit 204 may execute the first process and the second process respectively by executing sub-processes switchably with a general method, for example, a round robin method.

The main processor 200 further contains a switching instruction issuing unit 208, a processing time determining unit 206 and an image switching requesting unit 210. The switching instruction issuing unit 208 controls switching timing of the processes in the graphics processor 100. Among the processes which is executed in the graphics processor 100, the processing time determining unit 206 determines the processing time of the process of which the processing time for one step of process is controlled. The image switching requesting unit 210 issues an instruction to direct the display controller 104 to switch image displaying when one unit of display of the display image is completed in the graphics processor 100. One unit of display of image is a unit of image region displayed on the display apparatus 500 at a time, and hereinafter referred to as one frame.

According to the present embodiment, two processes are executed in the graphics processor 100, i.e., the process of the first image processing which is image processing originated from the first process and the process of the second image processing which is image processing originated from the second process. The process of the first image processing is a process which generates a base image and the process of the second image processing is a process which generates a display image by performing an additional processing when necessary. The switching instruction issuing unit 208 determines a point in time to switch from the process of the first image processing to the process of the second image processing by a processing completion notification issued by the process of the first image processing itself and, a point in time to switch from the process of the second image processing to the process of the first image processing by expiration of processing time determined by the processing time determining unit 206.

As shown in FIG. 1, the graphics processor 100 includes the arithmetic processing unit 106 which executes the processes of the first image processing and the second image processing alternately and generates a base image and a display image respectively, and the control block 102 which controls the overall processing in the graphics processor 100. The control block 102 includes an instruction acquiring unit 112, a process switching unit 116, a process completion notifying unit 118 and an image completion notifying unit 114. The instruction acquiring unit 112 acquires the instruction information issued by the main processor 200 and stored into the main memory 50. The process switching unit 116 executes a switching operation between the processes of the first image processing and the second image processing executed in the arithmetic processing unit 106. When the arithmetic processing unit 106 completes the process of the first image processing, the process completion notifying unit 118 detects the completion and notifies the main processor 200 of the completion. While the arithmetic processing unit 106 is executing the process of the second image processing, the image completion notifying unit 114 detects the completion of one frame of display image and notifies the image switching requesting unit 210 in the main processor 200 of the completion.

Figure 3:
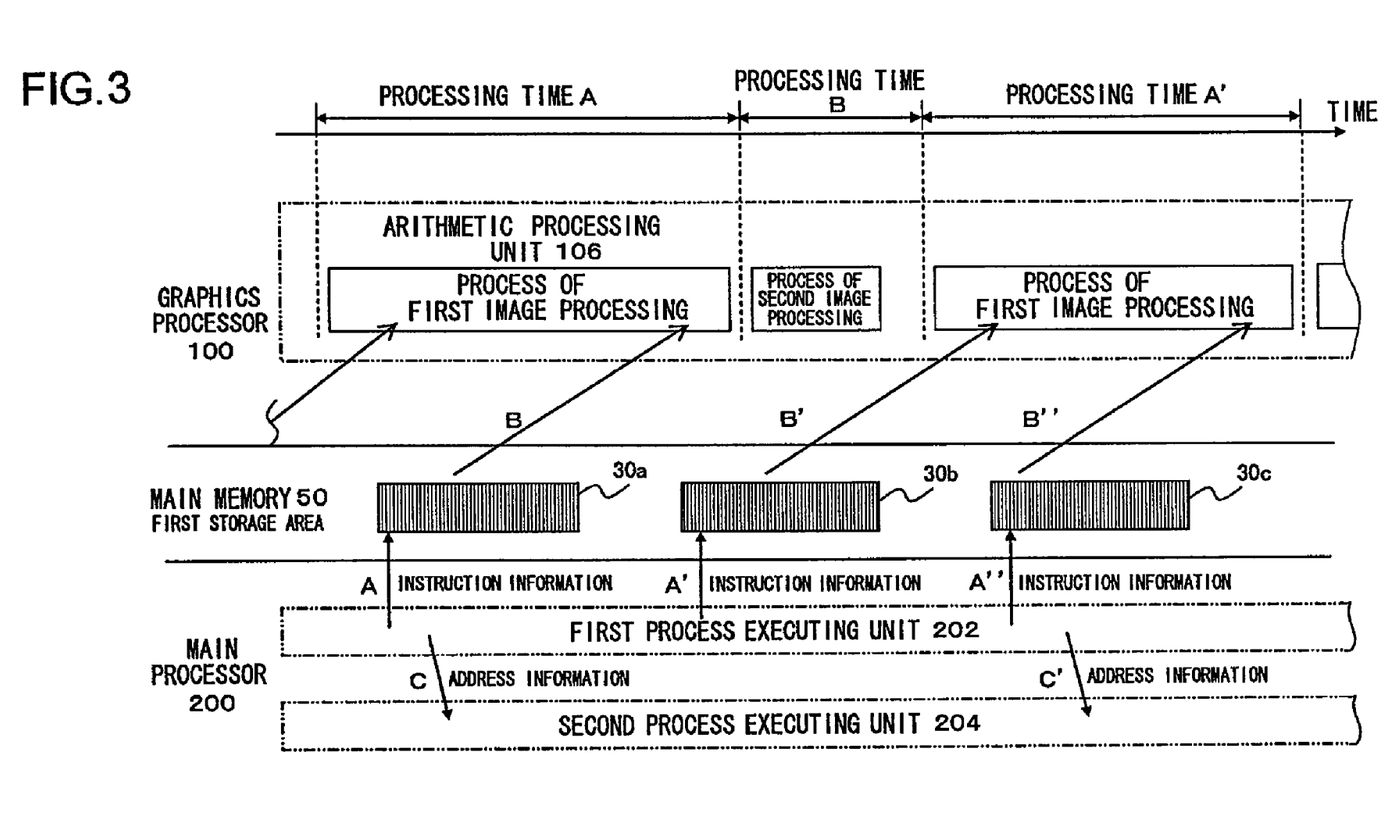
FIG. 3 is a schematic diagram illustrating the state wherein the process of the first image processing is executed in the graphics processor according to the present embodiment.
Figure 4:
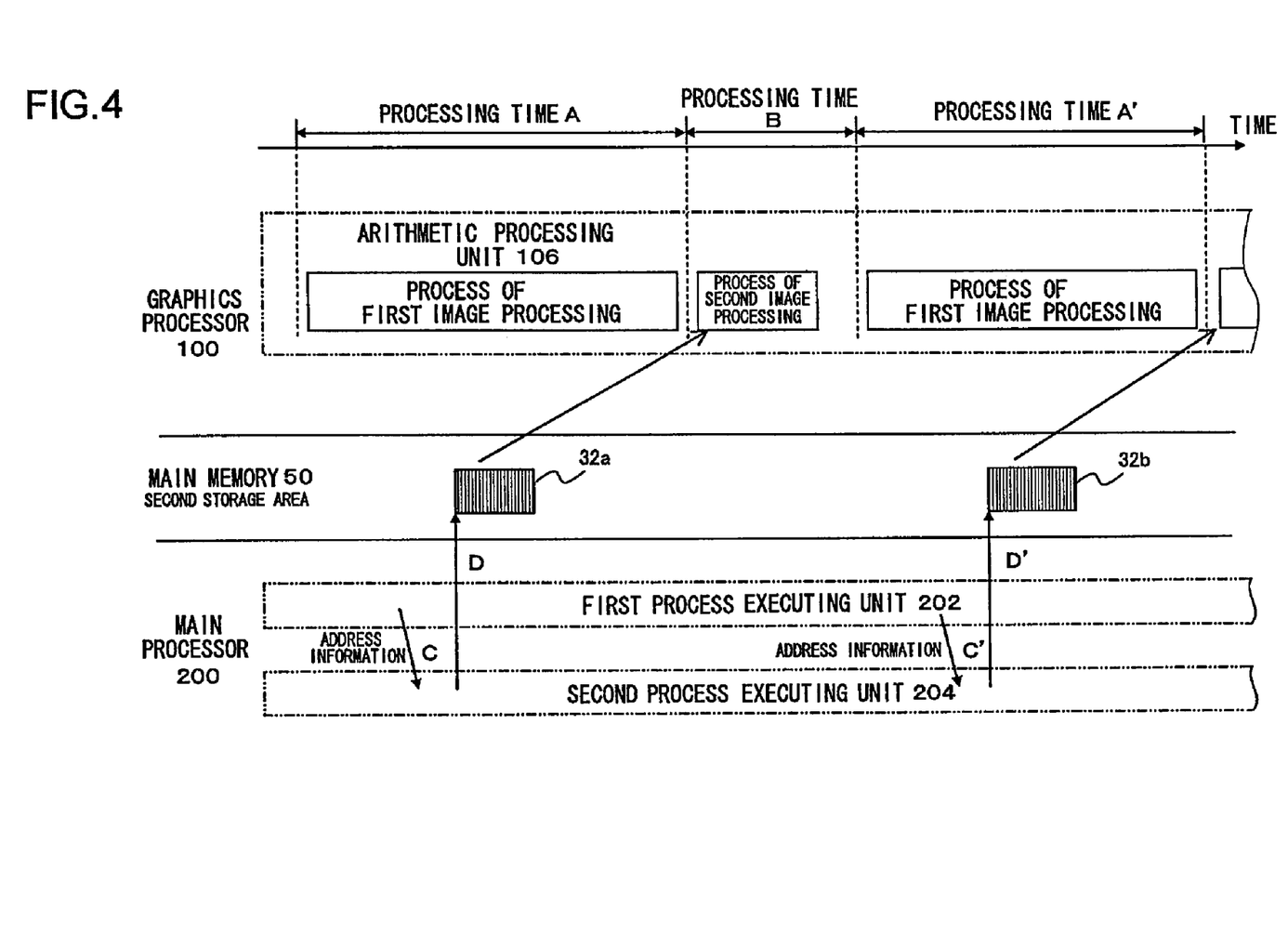
FIG. 4 is a schematic diagram illustrating the state wherein the process of the second image processing is executed in the graphics processor according to the present embodiment.

The following description explains the operation of the information processing apparatus 1000 configured as described above. FIG. 3 and FIG. 4 are schematic diagrams illustrating the flow of processes and communication of data among the main processor 200, the main memory 50 and the graphics processor 100 for executing each process in the graphics processor 100. FIG. 3 shows an operation for executing the process of the first image processing. FIG. 4 shows an operation for executing the process of the second image processing. In both figures, the horizontal axis indicates time.

As shown in FIG. 3 and FIG. 4 in common, the arithmetic processing unit 106 in the graphics processor 100 executes the processes of the first image processing and the second image processing alternately. The process of the first image processing continues until a predetermined items to be executed in one step of process is completed. As a result, processing time A and processing time A' of the process of the first image processing vary depending on the progression of the process. The phrase "Until a predetermined items to be executed in one step of process is completed" means "until an appropriate point in time to put an end to the process at which the quantity of processing necessary for process switching (e.g. saving of data in the middle of computation) is minimized. For example, the phrase means "until generation of one base image or a plurality of the base images is completed". This appropriate point to put an end may be designated in the program of the application which generates the first process executed by the first process executing unit 202 and is included in instruction information issued by the first process executing unit 202.

On the other hand, the process of the second image processing is executed in a given processing time B. The given processing time B may be a predetermined fixed time or a value determined by the processing time determining unit 206 appropriately according to the request of the first process executed by the first process executing unit 202. These two modes may be set selectable by an application, an OS or a user. To implement the latter mode, a processing timetable should be stored in the main memory 50 beforehand when loading the application. In the processing time table, IDs of the functions included in the application being executed by the first process executing unit 202 (e.g. chatting, a dialogue for cautionary notice or displaying of textual information) and necessary increment in processing time in the process of the second image processing to perform the function are stored in association with each other. When the first process executing unit 202 is going to perform these functions, the unit notifies the processing time determining unit 206 of the ID of the function. Based on the acquired ID, the processing time determining unit 206 searches the processing timetable and acquires the increment in processing time necessary for the function. By adding the acquired increment in time to the given processing time of the second image processing, the new processing time is determined. The processing time determining unit 206 may be contained in the first process executing unit 202 in a practical application.

A sum of the processing time A and processing time B may be synchronized or may not be synchronized with the period of vertical synchronizing signal for the display apparatus 500. In either of these cases, by limiting the process of the second image processing within the predetermined processing time B permitted by the first process, at least a certain time is secured for executing the first image processing in a unit of time. Thus, the real-time performance of the application is secured in case the application from which the first image processing, i.e., the first process is originated, requires real-time performance in image displaying (e.g. a game or a moving image reproduction). By variably setting the processing time A for executing the first image processing depending on the progression of the process, a time required for process switching (e.g. restoring of data) is reduced further, which enables to implement effective image processing in its entirety.

The instruction information 30*a*, 30*b* and 30*c* on the processing items to be executed by the arithmetic processing unit 106 when executing the process of the first image processing in the graphics processor 100 are generated in the first process executing unit 202 of the main processor 200 and stored into the first storage area of the main memory 50 successively as shown in FIG. 3 (arrow A, arrow A' and arrow A"). Groups of instructions which are bundles of a plurality of pieces of instruction information for each unit of processing are shown as the instruction information 30a, 30b and 30c. Each rectangle contained in the instruction information 30a, 30b and 30c shows instruction information for one unit of processing. Although each instruction information for one unit of processing may be independently transmitted from the first process executing unit 202 to the main memory 50, in FIG. 3, data-flow is shown by one arrow for each instruction information 30a, 30b and 30c for brevity.

The instruction information 30a, 30b and 30c stored in the first storage area of the main memory 50 are read out by the instruction acquiring unit 112 in the graphics processor 100, wherein one instruction group is treated as one unit. Then instruction information for one unit of processing issued first among the instruction group is processed first by the arithmetic processing unit 106. As described above, an instruction to stop the process of the first image processing is included in the instruction information.

According to the present embodiment, when instruction information on generation of a base image is generated in the first process executing unit 202, a storage area in the frame buffer 109 to store the base image is also determined. By variably setting the storage area, the capacity to be utilized can be changed depending on the executing state of an application (e.g. a game scene) which makes it possible to diversify generated images or to use the frame buffer 109 effectively.

As described above, in the process of the second image processing, a display image is generated by further processing on a base image generated in the process of the first image processing. The address information of the storage area in the frame buffer 109 for storing the base image which is determined in the first process executing unit 202 is provided to the second process executing unit 204 at a predetermined point in time (arrows C and C'). The address information may be an ID of a partitioned area in the frame buffer 109 or the like. Detailed description is given in the following of the predetermined point in time.

As shown in FIG. 4, the second process executing unit 204 acquires address information from the first process executing unit 202, generates the instruction information 32a and 32b, in which the address information are included, on the processing items to be executed by the arithmetic processing unit 106 when executing the process of the second image processing, and stores the instruction information in the second storage area in the main memory 50 (arrows D and D'). The way to show the instruction information 32a and 32b in FIG. 4 is identical with that in FIG. 3. The instruction acquiring unit 112 in the graphics processor 100 reads the instruction information 32a and 32b sequentially from the second storage area in the main memory 50 and makes the arithmetic processing unit 106 execute them in the same way as in FIG. 3. Since the process of the second image processing is switched depending on its processing time as described above, the instruction information 32a and 32b do not include an instruction to stop the process of the second image processing.

Figure 5:
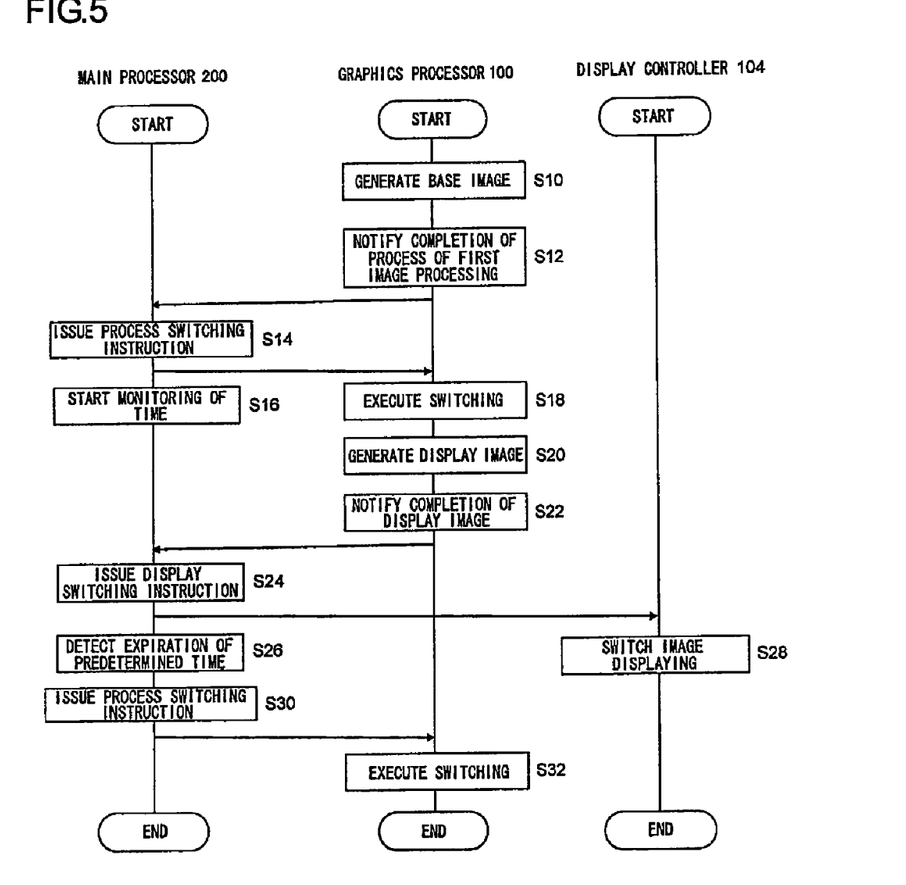
FIG. 5 is a flowchart for showing the procedures for switching between the processes of the first image processing and the second image processing, and for display switching of generated images according to the present embodiment.

FIG. 5 shows procedural steps of execution of the switching between the processes of the first image processing and the second image processing described above and the switching of displaying of the generated images. FIG. 5 illustrates procedural steps where each process of the first image processing and the second image processing is executed once. By executing the procedural steps repeatedly and displaying images sequentially, a moving image is displayed. The points in time to transmit instruction information for the processes of the first image processing and the second image processing are skipped in FIG. 5 and will be described in further detail in FIG. 6.

First, the instruction acquiring unit 112 in the graphics processor 100 acquires the instruction information 30a from the first storage area in the main memory 50 and makes the arithmetic processing unit 106 execute, such that the process of the first image processing is executed and a base image is generated (S10) as shown in FIG. 3. When the processing comes to the switching instruction included in the instruction information 30a, the process completion notifying unit 118 in the graphics processor 100 transmits an interrupt signal to the switching instruction issuing unit 208 in the main processor 200 and reports the completion of one step of process of the first image processing (S12). The base image generated in S10 may be one frame of an image or a plurality of frames of an image. Further, preprocessing for generating the subsequent base image after generating a base image may be included in one step of process of the first image processing. These items to be executed are all included in the instruction information 30a.

The switching instruction issuing unit 208 in the main processor 200 issues a process switching instruction to the graphics processor 100 (S14). The process switching instruction includes, for example, address information of the second storage area in the main memory 50 into which the instruction information 32a on the process of the second image processing to be subsequently executed by the arithmetic processing unit 106 is stored. At the same time, the switching instruction issuing unit 208 operates a timer (not shown) implemented inside and starts to monitor a lapse of time (S16). On acquiring the process switching instruction, the process switching unit 116 in the graphics processor 100 executes necessary processing for process switching, such as, saving data relating to the first image processing and notification of the address in which the instruction information 32a is stored to the instruction acquiring unit 112 (S18).

The instruction acquiring unit 112 in the graphics processor 100 acquires the instruction information 32a from the second storage area in the main memory 50 based on the address transmitted from the process switching unit 116 and makes the arithmetic processing unit 106 execute the process of the second image processing by which a display image is generated (S20). As described above, the instruction information 32a includes the address information of the storage area in the frame buffer 109 in which the image data of the base image generated in the process of the first image processing were previously stored. By identifying the image data of the base image based on the address information and by performing the additional processing items included in the instruction information 32a, a display image is generated in S20. In this process, the arithmetic processing unit 106 may perform the additional processing by overwriting the image data of the identified base image. Alternatively, the arithmetic processing unit 106 may generate image data on a new display image by reading out the identified image data and substituting them into an computing unit such as that performing a filtering process and stores the data on a new display image thus obtained into the frame buffer 109.

When one frame of display image is completed, the image completion notifying unit 114 notifies the main processor 200 of the completion (S22). On receiving the completion notification of the display image, the image switching requesting unit 210 in the main processor 200 issues an instruction for switching display images to be displayed on the display apparatus 500 with the address information on the storage area in the frame buffer 109 which stores the completed display image to the display controller 104 (S24). The address information on the display image which the image switching requesting unit 210 puts in the switching instruction may be acquired from the second process executing unit 204 or may be contained in the notification from the image completion notifying unit 114. On receiving the switching instruction of the display image, the display controller 104 identifies the image data on the newly completed display image based on the address information on the storage area which stores the display image transmitted from the second process executing unit 204. Then, the display controller 104 switches from the display image which have been displayed on the display apparatus 500 to the newly completed display image (S28). Display images may be switched right after the display controller 104 identifies the image data on the display image or after a certain time elapsed, taking the period of vertical synchronizing signal into consideration.

On the other hand, when the expiration of time allocated to the process of the second image processing is detected by the timer (not shown) in the main processor 200, the switching instruction issuing unit 208 in the main processor 200 issues an instruction for switching processes to the graphics processor 100 (S32). The instruction for switching processes includes information, for example, on an address in the first storage area of the main memory 50 into which the instruction information 30b of the process of the first image processing to be subsequently executed by the graphics processor 100 is stored. As described above, A fixed value or the value determined by the processing time determining unit 206 according to the request from the first process executing unit 202 may be set as an allocated time for the process of the second image processing. On acquiring the instruction for switching processes, the process switching unit 116 in the graphics processor 100 executes a necessary processing for switching of the processes, such as saving of the data relating to the second image processing or notification to the instruction acquiring unit 112 of the address in which instruction information 30b is stored (S32).

By switchably executing the processes of the first image processing which generates the base image and the second image processing which performs processing of the base image, in the arithmetic processing unit 106 in the graphics processor 100 according to the aforementioned procedure, a display image is generated and a display on the display apparatus 500 can be switched.

Figure 6:
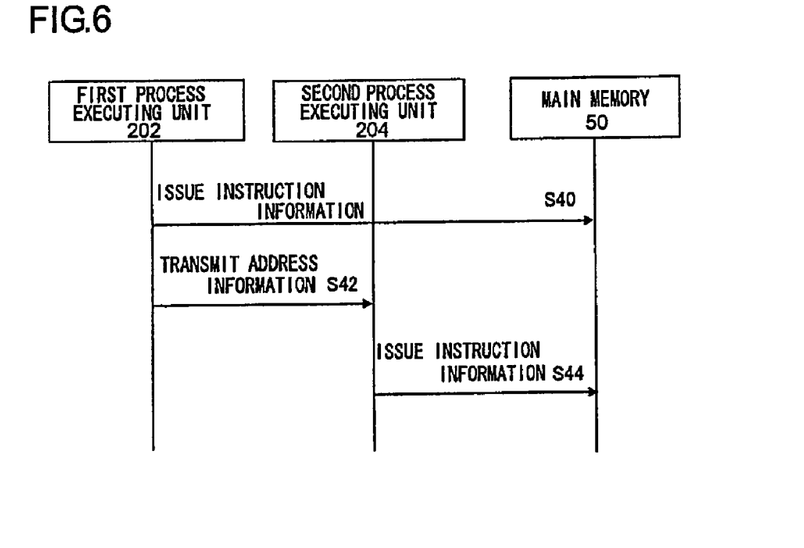
FIG. 6 is a time chart showing the timing for issuing instruction information by the first process executing unit and the second process executing unit, and for transmitting address information according to the present embodiment.

An explanation is given in the following of a point in time for transmitting address information on a base image from the first process executing unit 202 to the second process executing unit 204 when the instruction information 30a, 32a, etc are generated and issued in the first process executing unit 202 and in the second process executing unit 204. FIG. 6 shows a timing for issuing instruction information by the first process executing unit 202 and by the second process executing unit 204 and a timing for transmitting address information. To begin with, the first process executing unit 202 stores the generated instruction information into the main memory 50 as shown in FIG. 3 (S40). In this issuing process of the instruction information, a piece of instruction information for one unit of processing is transmitted one after another actually, as described above. As a result, a plurality of piece of instruction information accumulated in the main memory 50 form one group of instructions. Thus S40 has a certain time span. At a certain point in the time span, the first process executing unit 202 transmits the address information of the base image to the second process executing unit 204 (S42). For example, the first process executing unit 202 transmits the address information to the second process executing unit 204 when instruction information on a predetermined processing included in instruction information for a plurality of units of processing issued in S40 is transmitted to the main memory 50. After acquiring the address information transmitted in S42, the second process executing unit 204 generates instruction information including the address information and stores into the main memory 50 (S44).

Figure 7:
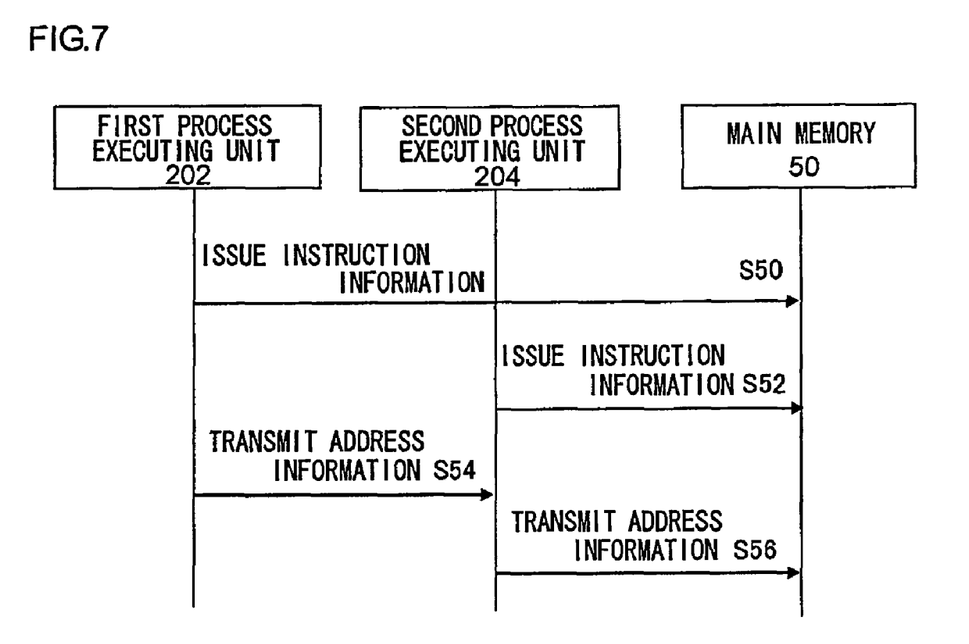
FIG. 7 is a time chart showing the timing for issuing instruction information by the first process executing unit and the second process executing unit, and for transmitting address information in another case according to the present embodiment.

On the other hand, the instruction information may be completed by adding the address information to the instruction information once stored in the main memory 50. FIG. 7 shows a timing to issue the instruction information and to transmit the address information in case of filling up the address information after issuing the instruction information. The first process executing unit issues instruction information in the same manner as shown in FIG. 6 (S50), and transmits the address information to the second process executing unit 204 at a certain point in the time span (S54). On the other hand, differing from the case in FIG. 6, the second process executing unit 204 generates preliminary instruction information and stores the information in the main memory 50 while not waiting the transmission of address information from the first process executing unit 202 (S52). In this process, the second process executing unit 204 configures the data area where the address information of the base image should be set blank, for example, and stores the address or the ID of the area in the main memory 50. On acquiring the address information in S54, the second process executing unit 204 stores the address information so that the information is filled into the stored blank data area among the previously stored instruction information in the main memory 50 (S56). Since the instruction information 30a or the instruction information 32a needs to be completed and stored in the main memory 50 before the process corresponding to each instruction is started in the graphics processor 100, the manner shown in FIG. 6 and the manner shown in FIG. 7 may be set selectable depending on the state of instruction information generating process.

As described above, by transmitting the address information of a base image from the first process executing unit 202 to the second process executing unit 204, the image data on the base image is able to be identified in the process of the second image processing, even if the storage area for image data on the base image is changed in the process of the first image processing. In this manner, the address of a base image in the frame buffer 109 is able to be allocated dynamically, which makes the data size of the base image changeable according to the state of processing in the application, (e.g. a scene in a game). Further, the number of base images or display images to be stored in the frame buffer 109 is set changeable.

According to the present embodiment described above, the stop point of a processing time A of the process of the first image processing which processes a main image corresponding to an application is set dynamically by the application. This makes it possible to switch processes from the first image processing to the second image processing at an optimal point in time, for example, a point when the overhead caused by executing data saving is small. Further, in case of such switching timing, the number of switching in a graphic processor can be reduced compared with, for example, the case in which the timing is synchronized with the switching of processes in the main processor 200. Further, the main processor 200 does not have to wait to switch its processes until the process switching in the graphics processor 100 gets executable. As a result, entire efficiency for image processing is improved and the speed for image generating process is increased.

The processing time B of the process of the second image processing which generates the eventual display image by performing a desired processing on the base image is predetermined. This allows the changing in items to be executed in the second image processing not to affect the processing time A of the process of the first image processing. Thus a base image is generated in a certain unit of time without a fail, which leads to a generation an excellent real-time moving image. Further, the processing time B may also be adjusted so that the items to be executed in the process of the second image processing is not limited. Since this adjustment is only enabled by the instruction from the first process executing unit 202 from which the first image processing arises, this adjustment does not cause unexpected delay in a generation of a base image. Thus, the real-time performance of the generated moving image is insured. For these reason, even if the sum of the processing time A and the processing time B is not synchronized with a period of a vertical synchronizing signal, it is possible to generate a moving image with excellent real-time performance.

Further, according to the present embodiment, the first process executing unit 202 from which the first image processing arises determines the address information in the frame buffer 109 of the base image generated in the first image processing and notifies the second process executing unit 204. Thus, even if the storage area of the image data on the base image to be processed varies, the data is always identified in the process of the second image processing required by the second process executing unit. As a result, the size of the data included in the base image can be set variable or the number of base images or display images stored in the frame buffer 109 can be set variable. Thus, a variety of images can be displayed depending on, for example, the state of processing in an application.

As described above, the present embodiment allows the implementation of an information processing apparatus with a real-time performance while a processing condition in the graphics processor 100 (e.g. processing time or the data size of the image to be stored temporary) can be set by the application. This increases flexibility in program designing of an application and makes a variety of expression in an image world possible. Since the present embodiment is performed in real-time even if the period of image processing is different from the period of a vertical synchronizing signal, the present embodiment is easily applicable to a display apparatus of which the frequency is different by making some adjustments when designing a program of an application.

Given above is an explanation based on the exemplary embodiment. The embodiment is intended to be illustrative only and it will be obvious to those skilled in the art that various modifications to constituting elements and processes could be developed and that such modifications are also within the scope of the present invention.

The present invention is applicable to an electronic apparatus, such as, a computer, a game console, a mobile phone or the like.

The invention claimed is

1. An information processing apparatus comprising:
a graphics processor which switches and executes a process of a first image processing generating image data on a first image as a unit of display and a process of a second image processing performing processing of the first image and generating a second image; and
a main processor which controls the graphics processor, wherein the graphics processor comprises:
an arithmetic processing unit which executes one step of process of the first image processing, variably controlling one processing time span, and executes one step of process of the second image processing within a predetermined processing time; and
a process completion notifying unit which notifies the main processor about completion of one step of process of the first image processing, and
the main processor comprises a process switching requesting unit which requests the graphics processor to switch the process in the arithmetic processing unit from the process of the first image processing to the process of the second image processing when detecting the completion of one step of process of the first image processing communicated by the process completion notifying unit and to switch the process in the arithmetic processing unit from the process of the second image processing to the process of the first image processing at the point in time when the predetermined processing time expires.

2. The information processing apparatus according to claim 1, wherein time for one step of process of the first image processing in the arithmetic processing unit ends at a point in time when the requested certain items to be executed in one step of process of the first image processing completes.

3. The information processing apparatus according to claim 1, further comprising a display apparatus controlling unit which controls a display apparatus displaying the second image, wherein:
the graphics processor comprises an image completion notifying unit which, when the generation of image data on the new second image is completed in the process of the second image processing executed by the arithmetic processing unit, notifies the main processor of that;
the main processor further comprises an image switching requesting unit which acquires the notification about the completion of the generation of image data on the new second image communicated by the image completion notifying unit and requests the display apparatus controlling unit to switch images; and
the display apparatus controlling unit controls the display apparatus to display the new second image after receiving the request for switching from the image switching requesting unit.

4. The information processing apparatus according to claim 3, wherein one unit of processing which consists of one step of process of the first image processing and one step of process of the second image processing is executed not in synchronization with the vertical synchronizing signal for displaying an image on the display apparatus.

5. The information processing apparatus according to claim 1 further comprising a local memory including a storage area into which the graphics processor temporally stores the image data on the first image; wherein
the main processor further comprises:
a first process executing unit which generates and issues request information on items to be executed in the process of the first image processing to the graphics processor; and
a second process executing unit which generates and issues request information on items to be executed in the process of the second image processing to the graphics processor; wherein
the first process executing unit determines information on the storage area in the local memory for the image data on the first image when generating the request information on items to be executed in the process of the first image processing and provides the information on the storage area for the image data on the first image to the second process executing unit; and the second process executing unit incorporates the information on the storage area acquired from the first process executing unit in the request information on items to be executed in the process of the second image processing; and the arithmetic processing unit in the graphics processor identifies, in the process of the second image processing, image data of the first image based on information on the storage area included in the instruction information acquired from the second process executing unit and performs processing of the identified image data.

6. The information processing apparatus according to claim 1, wherein the process switching requesting unit requests the graphics processor to switch the process in the arithmetic processing unit from the process of the second image processing to the process of the first image processing at a point in time when the fixed predetermined processing time expires.

7. The information processing apparatus according to claim 5, wherein the process switching requesting unit requests the graphics processor to switch the process in the arithmetic processing unit from the process of the second image processing to the process of the first image processing at a point in time when a processing time selected from a plurality of predetermined processing times in accordance with the request from the first process executing unit expires.

8. The information processing apparatus according to claim 5, wherein the second process executing unit acquires the information on the storage area provided from the first process executing unit and subsequently generates request information on items to be executed in the process of the second image processing including the information on the storage area.

9. The information processing apparatus according to claim 5, wherein the main processor further comprises a main memory which stores the request information on items to be executed, and the second process executing unit, before acquiring the information on the storage area provided from the first process executing unit, generates request information on items to be executed in the process of the second image processing except for information on the storage area and stores the information into the main memory, and when acquiring the information on the storage area provided from the first process executing unit, completes the request information on items to be executed in the process of the second image processing by writing the information on the storage area into the request information on items to be executed in the process of the second image processing stored in the main memory.

10. The information processing apparatus according to claim 5, wherein the arithmetic processing unit generates image data on the second image in the process of the second image processing by writing on image data on the first image stored in the storage area in the local memory.

11. The information processing apparatus according to claim 5, wherein the arithmetic processing unit reads out image data on the first image stored in the storage area in the local memory and stores the image data on the second image gained by performing processing of the read image data into the storage area in the local memory in the process of the second image processing.

12. The information processing apparatus according to claim 5, wherein the first process executing unit incorporates an instruction for stopping one step of process of the first image processing into the request information on items to be executed in the process of the first image processing, and the process completion notifying unit notifies the main processor of completion of one step of process at a point in time when the processing by the arithmetic processing unit reaches the instruction for stopping one step of process.

* * * * *